(12) United States Patent
Chung et al.

(10) Patent No.: US 6,806,995 B2
(45) Date of Patent: Oct. 19, 2004

(54) ELECTROPHORETIC DISPLAY WITH HOLDING ELECTRODES

(75) Inventors: Jerry Chung, Mountain View, CA (US); David Chen, Buena Park, CA (US)

(73) Assignee: SIPIX Imaging, Inc., Milpitas, CA (US)

( * ) Notice: Subject to any disclaimer, the term of this patent is extended or adjusted under 35 U.S.C. 154(b) by 0 days.

(21) Appl. No.: 10/282,444

(22) Filed: Oct. 28, 2002

(65) Prior Publication Data

US 2003/0081305 A1 May 1, 2003

Related U.S. Application Data

(60) Provisional application No. 60/346,007, filed on Oct. 29, 2001.

(51) Int. Cl.[7] .............................................. G02B 26/00
(52) U.S. Cl. ........................................ 359/296; 359/271
(58) Field of Search ................................. 359/265, 296, 359/253, 271, 269; 345/107; 204/450, 606

(56) References Cited

U.S. PATENT DOCUMENTS

| | | | |
|---|---|---|---|
| 3,612,758 A | 10/1971 | Evans et al. | 178/5.4 R |
| 3,668,106 A | 6/1972 | Ota | 204/299 |
| 3,697,679 A | 10/1972 | Hathaway | 178/6.6 A |
| 4,071,430 A | 1/1978 | Liebert | 204/299 |
| 4,093,534 A | 6/1978 | Carter et al. | 350/355 |
| 4,285,801 A | 8/1981 | Chiang | 204/299 R |
| 4,655,897 A | 4/1987 | DiSanto et al. | 204/299 R |
| 4,663,192 A | 5/1987 | Hatakeyama | 427/108 |
| 4,680,103 A | 7/1987 | Beilin et al. | 204/299 R |
| 4,741,988 A | 5/1988 | Van der Zande et al. | 430/312 |
| 4,995,718 A | 2/1991 | Jachimowicz et al. | 353/31 |
| 5,102,497 A | 4/1992 | Hamaguchi et al. | 156/656 |
| 5,177,476 A | 1/1993 | DiSanto et al. | 345/107 |

(List continued on next page.)

FOREIGN PATENT DOCUMENTS

| | | | |
|---|---|---|---|
| EP | 1 089 117 A2 | 4/2001 | G02F/1/167 |
| JP | 59-171930 | 9/1984 | G02F/1/19 |
| WO | WO 99/56171 | 11/1999 | G02F/1/167 |
| WO | WO 00/36465 | 6/2000 | G02F/1/167 |
| WO | WO 00/60410 | 10/2000 | G02F/1/167 |
| WO | WO 01/67170 | 9/2001 | G02F/1/167 |
| WO | WO 02/073304 | 9/2002 | G02F/1/167 |

OTHER PUBLICATIONS

Cominsky, B. et al., "An Electrophoretic Ink for All–Printed Reflective Electronic Displays", Letters to Nature, pp. 253–255 (1998).

Dalisa, A. L., "Electrophoretic Display Technology", IEEE Transactions of Electron Devices, Jul. 1997, pp. 827–834.

(List continued on next page.)

*Primary Examiner*—Scott J. Sugarman
*Assistant Examiner*—Richard Hanig (57) ABSTRACT

An electrophoretic display having at least one holding electrode is disclosed. The display comprises a plurality of electrophoretic cells filled with charged particles dispersed in a dielectric solvent. Each said cell is positioned between a top electrode layer and a bottom electrode layer. The top electrode layer comprises at least one driving electrode positioned over more than one cell. The bottom electrode layer comprises at least one driving electrode positioned under more than one cell. The display further comprises a holding electrode located in the bottom electrode layer. The display may further comprise a colored background located under and visible through the bottom electrode layer.

30 Claims, 8 Drawing Sheets

U.S. PATENT DOCUMENTS

| | | | |
|---|---|---|---|
| 5,276,438 A | 1/1994 | DiSanto et al. | 345/107 |
| 5,279,511 A | 1/1994 | DiSanto et al. | 445/24 |
| 5,380,362 A | 1/1995 | Schubert | 106/493 |
| 5,403,518 A | 4/1995 | Schubert | 252/572 |
| 5,573,711 A | 11/1996 | Hou et al. | 252/572 |
| 5,589,100 A | 12/1996 | Grasso | 252/299.01 |
| 5,699,097 A | 12/1997 | Takayama et al. | 347/171 |
| 5,835,174 A | 11/1998 | Clinkeman et al. | 349/86 |
| 5,914,806 A | 6/1999 | Gordon, II et al. | 359/296 |
| 5,930,026 A | 7/1999 | Jacobson et al. | 359/296 |
| 5,961,804 A | 10/1999 | Jacobson et al. | 204/606 |
| 5,976,405 A | 11/1999 | Clinkeman et al. | 252/299.01 |
| 6,017,584 A | 1/2000 | Albert et al. | 427/213.3 |
| 6,037,058 A | 3/2000 | Clinkeman et al. | 428/402.2 |
| 6,067,185 A | 5/2000 | Albert et al. | 359/296 |
| 6,111,598 A | 8/2000 | Faris | 348/57 |
| 6,113,810 A | 9/2000 | Hou et al. | 252/572 |
| 6,120,588 A | 9/2000 | Jacobson | 106/31.16 |
| 6,120,839 A | 9/2000 | Comiskey et al. | 427/213.3 |
| 6,172,798 B1 | 1/2001 | Albert et al. | 359/296 |
| 6,184,856 B1 | 2/2001 | Gordon, II et al. | 345/107 |
| 6,232,950 B1 | 5/2001 | Albert et al. | 345/107 |
| 6,252,624 B1 | 6/2001 | Yuasa et al. | 348/56 |
| 6,312,304 B1 | 11/2001 | Duthaler et al. | 445/24 |
| 6,327,072 B1 | 12/2001 | Comiskey et al. | 359/296 |
| 6,337,761 B1 | 1/2002 | Rogers et al. | 359/296 |
| 6,392,786 B1 | 5/2002 | Albert | 359/296 |
| 6,639,580 B1 * | 10/2003 | Kishi et al. | 345/107 |
| 2001/0030639 A1 | 10/2001 | Goden | 345/107 |
| 2002/0126249 A1 | 9/2002 | Liang et al. | 349/187 |
| 2002/0182544 A1 | 12/2002 | Chan-Park et al. | 430/311 |

OTHER PUBLICATIONS

Drzaic, Pl, "Liquid Crystal Dispersion", The PDLC Paradigm, (1995) p. 1–9.

Harvey, T. G. "Replication Techniques for Micro–Optics", SPIE, vol. 3099, p 76–82 (1997).

Hooper, M.A. and Novotny, V., "An Electrophoretic Display, It's Properties, Model and Addressing" IEEE Transactions on Electron Devices, vol. ED–26, No. 8, Aug. 1979, pp. 1148–1152.

Harbour, J.R. et al, "Subdivided Electrophoretic Display", Xerox Disclosure Journal, vol. 4, No. 6 (1979).

Inoue, et al, "Low Temperature Poly–Si TFT—Electrophoretic Displays (TFT–EPDs) with Four Level Gray Scale", Int'l Electron Devices Meeting 2000, Technical Digest San Francisco, CA Dec. 10–13, 2000, pp. 197–200.

Lewis, J.C., et al., "Gravitational, Inter–Particle and Particle–Electrode Forces in Electrophoretic Display" Proceeding of the S.I.D., vol. 18/3&4 1977.

Liang, et al, "Microcup LCD, A New Type of Dispersed LCD by a Roll–to–Roll Manufacturing Process", IDMC '03 Taiwan, Feb. 18–21, 2003.

U.S. patent application Ser. No. 09/518,488, Liang et al., filed Mar. 3, 2000.

U.S. patent application Ser. No. 09/606,654, Liang et al., filed Jun. 28, 2000.

Liang, R.C., et al, "Microcup Electrophorectic Displays by Roll–to–Roll Manufacturing Processes", IDW '02 Proceedings, EP2–2, p. 1337, Dec. 2002, Hiroshima, Japan.

Liang, R.C., et al, "Passive Matrix Microcup Electrophoretic Displays", IDMC '03 Proceedings, Fr–17–05, p. 351, Feb. 2003, Taipei, Taiwan.

Liang, R.C., "Microcup EPDs and LCDs by Roll–to–Roll Manufacturing Process", USDC Flexible Microelectronics and Display Conferences. Feb. 3–4, 2003, Phoenix AZ.

Liang, R.C., et al, "Microcup Active and Passive Matrix Electrophoretic Displays by Roll–to–Roll Manufacturing Processes", SID '03 Digest, paper 20.1, May 17, 2003, Baltimore, MD.

Murau, P., et al., "The Understanding and Elimination of Some Suspension Instabilities in an Electrophoretic Display", J. Appl. Phys., 49 (9), (1978).

Nakamura, E., et al., "Development of Electrophoretic Display Using Microcapsulated Suspension", SID Digest, (1998), pp. 1014–1017.

Ota, I., et al., "Electrophoretic Image Display EPID Panel", Proceedings of the IEEE, vol. 1, No. 7, Jul. 1973.

Singer, B. et al, "An X–Y Addressable Electrophoretic Display", Proceeding of the S.I.D., vol. 18/3&$, (1977).

Slafer, D.W., et al., "Continuous Manufacturing of Thin Cover Sheet Optical Media", SPIE, vol. 1663, (1992), pp. 323–335.

* cited by examiner

ELECTROPHORETIC DISPLAY WITH HOLDING ELECTRODES

This application claims Benefit of application Ser. No. 60/346,007, filed Sep. 29, 2001.

BACKGROUND OF THE INVENTION

The electrophoretic display (EPD) is a non-emissive device based on the electrophoresis phenomenon of charged pigment particles suspended in a solvent. It was first proposed in 1969. The display usually comprises two plates with electrodes placed opposing each other, separated by using spacers. One of the electrodes is usually transparent. A suspension composed of a colored solvent and charged pigment particles is enclosed between the two plates. When a voltage difference is imposed between the two electrodes, the pigment particles migrate to one side and then either the color of the pigment or the color of the solvent can be seen according to the polarity of the voltage difference.

There are several different types of EPDs. In the partition type EPD (see M. A. Hopper and V. Novotny, *IEEE Trans. Electr. Dev.*, 26(8):1148–1152 (1979)), there are partitions between the two electrodes for dividing the space into smaller cells in order to prevent undesired movements of particles such as sedimentation. The microcapsule type EPD (as described in U.S. Pat. Nos. 5,961,804 and 5,930,026) has a substantially two dimensional arrangement of microcapsules each having therein an electrophoretic composition of a dielectric fluid and a suspension of charged pigment particles that visually contrast with the dielectric solvent. Another type of EPD (see U.S. Pat. No. 3,612,758) has electrophoretic cells that are formed from parallel line reservoirs. The channel-like electrophoretic cells are covered with, and in electrical contact with, transparent conductors. A layer of transparent glass from which side the panel is viewed overlies the transparent conductors.

An improved EPD technology was disclosed in co-pending applications, U.S. Ser. No. 09/518,488 (corresponding to WO01/67170), filed on Mar. 3, 2000, U.S. Ser. No. 09/759,212, filed on Jan. 11, 2001, U.S. Ser. No. 09/606,654, filed on Jun. 28, 2000 (corresponding to WO02/01280) and U.S. Ser. No. 09/784,972, filed on Feb. 15, 2001, all of which are incorporated herein by reference. The improved EPD comprises closed cells formed from microcups of well-defined shape, size and aspect ratio and filled with charged pigment particles dispersed in a dielectric solvent.

Figure 1:
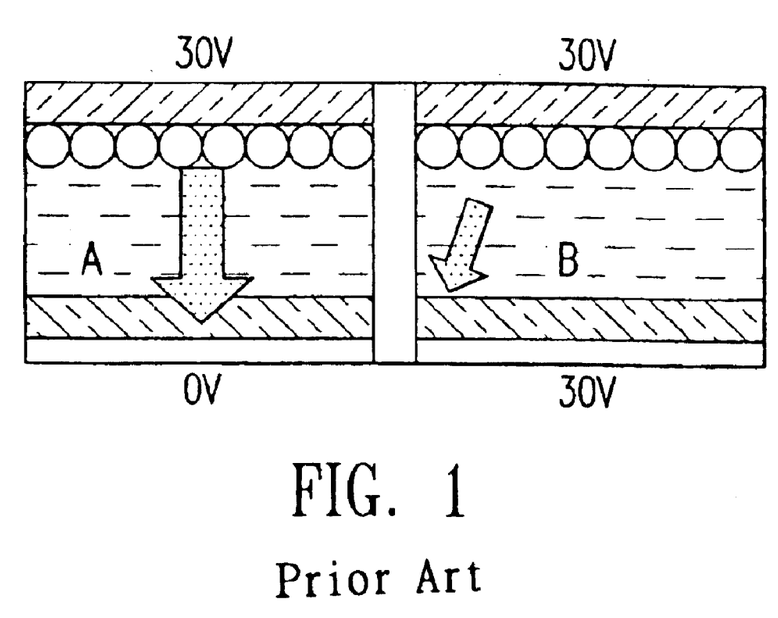
FIG. 1 illustrates the "cross talk" phenomenon of an EPD.

All of these EPDs may be driven by a passive matrix system. For a typical passive matrix system, there are row electrodes on the top side and column electrodes on the bottom side of the cells. The top row electrodes and the bottom column electrodes are perpendicular to each other. However, there are two well-known problems associated with EPDs driven by a passive matrix system: cross talk and cross bias. Cross talk occurs when the particles in a cell are biased by the electric field of a neighboring cell. FIG. 1 provides an example. The bias voltage of the cell A drives the positively charged particles towards the bottom of the cell. Since cell B has no voltage bias, the positively charged particles in cell B are expected to remain at the top of the cell. However, if the two cells, A and B, are close to each other, the top electrode voltage of cell B (30V) and the bottom electrode voltage of cell A (0V) create a cross talk electric field which forces some of the particles in cell B to move downwards. Widening the distance between adjacent cells may eliminate such a problem; but the distance may also reduce the resolution of the display.

The cross talk problem may be lessened if a cell has a significantly high threshold voltage. The threshold voltage, in the context of the present invention, is defined to be the maximum bias voltage that may be applied to a cell without causing movement of particles between two electrodes on opposite sides of the cell. If the cells have a sufficiently high threshold voltage, the cross-talk effect is reduced without sacrificing the resolution of the display.

Unfortunately, the cells in EPDs made using the typical electrophoretic materials and techniques currently available typically do not have a sufficiently high driving threshold voltage to prevent the undesired movement of particles. As a result, the EPDs constructed from these materials usually cannot achieve high resolution.

Cross bias is also a well-known problem for a passive matrix display. The voltage applied to a column electrode not only provides the driving bias for the cell on the scanning row, but it also affects the bias across the non-scanning cells on the same column. This undesired bias may force the particles of a non-scanning cell to migrate to the opposite electrode. This undesired particle migration causes visible optical density change and reduces the contrast ratio of the display. A system having gating electrodes was disclosed in U.S. Pat. Nos. 4,655,897 and 5,177,476 (assigned to Copytele, Inc.) to provide EPDs capable of high resolution at relative high driving voltage using a two layer electrode structure, one of which layers serves as a gating electrode. Although these references teach how the threshold voltage may be raised by the use of gating electrodes, the cost for fabricating the two electrode layers is extremely high due to the complexity of the structure and the low yield rate. In addition, in this type of EPD, the electrodes are exposed to the solvent, which could result in an undesired electroplating effect.

In many cases it is desirable to be able to display shades and colors other than the main display colors. For example, in a display in which the main colors are white and black, such as an electrophoretic display in which the cells may be shifted between a white state and a black state, it may be desirable to be able to display shades of gray. This is referred to in the art as a grayscale display.

There are various means to achieve a grayscale display. Spatial modulation creates grayscale by dithering, a process by which a certain proportion of pixels within a localized area of the array of pixels (or cells) that comprise the display are set to a first color and the remainder of pixels in the localized area are set to a second color, giving the visual effect to one viewing the display of a shade in between the first and second colors. For example, to achieve a shade of gray, every other pixel in the localized area may be set to white and the remainder set to black. To achieve a lighter shade of gray, a higher proportion of pixels in the localized area may be set to white. To achieve a darker shade of gray, a higher proportion of pixels in the localized area may be set to black. Other shades and colors may be displayed or approximated by combining pixels set to two or more different colors. Another way to achieve a grayscale display is to use frame rate control to quickly switch one or more pixels on and off in such a way that the eye perceives the pixels as gray.

Both of the methods described above for achieving a grayscale display are commonly used in twisted nematic (TN) and super-twisted nematic (STN) liquid crystal displays (LCD's). However, there are major deficiencies in those systems. Spatial modulation effectively reduces the image resolution and also can generate a visible dithering dot effect, in which the eye perceives dots or unevenness in the dithered areas, especially in very light gray areas (sometimes called the highlight area). Frame rate control requires a higher driving frequency to quickly switch the pixels on and off, and also certain color areas may appear to be in motion.

Figure 2A:
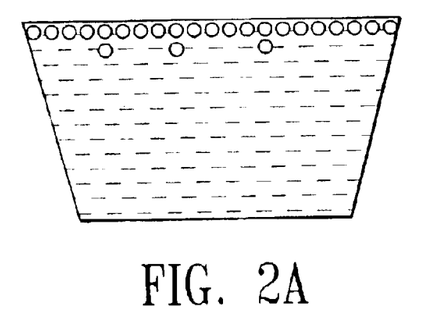
FIG. 2A is a schematic depiction of the particle distributions in the white (0% grayscale) state.
Figure 2B:
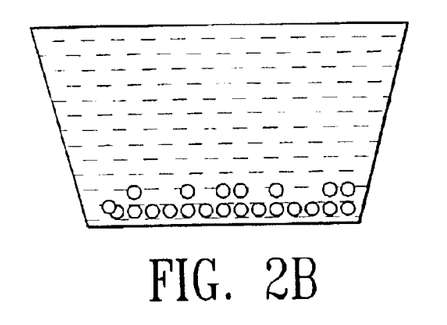
FIG. 2B is a schematic depiction of the particle distributions in the black (100% grayscale) state.
Figure 2C:
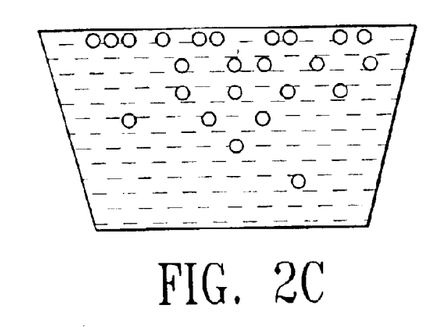
FIG. 2C is a schematic depiction of the particle distributions in the 60% grayscale state.
Figure 2D:
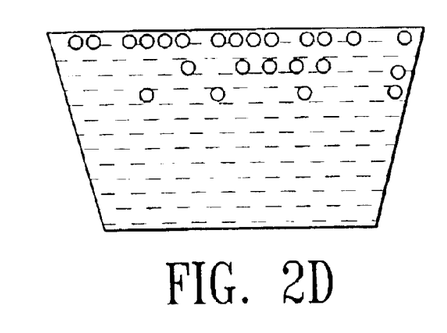
FIG. 2D is a schematic depiction of the particle distributions in the 25% grayscale state.

The fact that EPD cells may be set to one of multiple stable states makes EPD technology very suitable for use as a grayscale display. FIGS. 2A–2D show the side view of an EPD cell in which white charged particles are suspended in a black solvent. FIG. 2A shows a white state in which all of the white particles have been driven to the top. FIG. 2B shows a black state in which all of the white particles have been driven to the bottom. FIG. 2C shows a 60% gray state in which approximately 60% of the white particles have been driven away from the top with the remaining 40% of the white particles remaining at the top of the cell. FIG. 2D shows a 25% gray state in which approximately 25% of the white particles have been driven away from the top of the cell.

Those skilled in the art will recognize there are at least three ways to drive an EPD as a grayscale display:

1. Voltage Amplitude Modulation: By applying bias voltages of different amplitudes to different EPD cells, the charged particles in the EPD cells are driven to various distributions, depending on the amplitude of the respective bias voltage applied to each cell, which cause various gray level perceptions.
2. Pulse Width Modulation (PWM): By applying driving pulses of different pulse widths to different EPD cells, the charged particles are driven to various distributions, which also cause various gray level perceptions.
3. Pulse Rate Modulation: By applying different numbers of driving pulses to different EPD cells, in a finite driving period that is the same for each cell, the charged particles are driven to various distributions, which cause various gray level perceptions.

The three driving pulse modulation algorithms described above can also be combined to achieve optimal grayscale quality. The same grayscale driving algorithms can also be applied to a color EPD, which greatly improves the color quality of the display.

However, when the modulation algorithms described above are applied to an EPD in a typical passive matrix, with either up/down switching (particles switched between a top electrode and a bottom electrode) or in-plane switching (particles switched between being dispersed in the solvent and being held at side electrodes), the cross bias and cross talk effects described above make the gray level very difficult to control. Unless the cells have an adequately high threshold voltage, the cross talk and cross bias effects may cause undesired particle movement, which causes the gray level to change. It is difficult, however, to achieve such a high threshold voltage using the materials, processes and techniques available currently.

Therefore, there is a need for an electrophoretic display in which the cross talk and cross bias effects will not cause a degradation of display performance, even if cells having a relatively low intrinsic threshold voltage are used. In addition, there is a need to provide such a display in which a grayscale may be achieved without a degradation of performance due to cross talk and/or cross bias.

SUMMARY OF THE INVENTION

A typical EPD has a top electrode layer, which in one embodiment may have one or more row electrodes and a bottom electrode layer, which in one embodiment may have one or more column electrodes. In the absence of a holding electrode, such as those described herein, in one embodiment the electric field generated by the row and column electrodes would control the up/down movement of the charged particles in EPD cells positioned between the top electrode layer and the bottom electrode layer at the locations at which the row and column electrodes intersect. Such an electrode structure is very sensitive to the cross talk and cross bias effect. An improved design having at least one holding electrode is disclosed. In one embodiment, the holding electrode is in the bottom electrode layer and parallel to the column electrode. The holding electrode and the top row electrode are used to hold the particles during non-scanning cycles.

In one embodiment, the electrophoretic display comprises a plurality of electrophoretic cells filled with charged particles dispersed in a dielectric solvent. Each said cell is positioned between a top electrode layer and a bottom electrode layer. The top electrode layer comprises at least one driving electrode positioned over more than one cell. The bottom electrode layer comprises at least one driving electrode positioned under more than one cell. The display further comprises a holding electrode located in the bottom electrode layer.

An electrophoretic grayscale display is disclosed. In one embodiment, the display comprises a plurality of electrophoretic cells filled with charged particles dispersed in a dielectric solvent. Each said cell is positioned between a top electrode layer and a bottom electrode layer. The top electrode layer comprises at least one driving electrode positioned over more than one cell. The bottom electrode layer comprises at least one driving electrode positioned under more than one cell. The display further comprises a holding electrode located in the bottom electrode layer. The display further comprises a colored background layer located under and visible through the bottom electrode layer.

In one embodiment, the EPD cells have positively charged particles and the voltage applied to the holding electrode and top row electrode is lower than the voltage applied to any other electrode during non-scanning cycles. Therefore, the positively charged particles attracted at these electrodes will not migrate.

The holding electrode(s) provide a holding effect, which prevents undesired movement of the charged particles in the cells. This eliminates the need to provide cells with a threshold voltage high enough to avoid the cross talk and/or cross bias effects described above. In addition, the design of the present invention can be manufactured using low cost materials by efficient processes.

These and other features and advantages of the present invention will be presented in more detail in the following detailed description and the accompanying figures, which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

I. Various Holding Electrode Structures

Figure 3A:
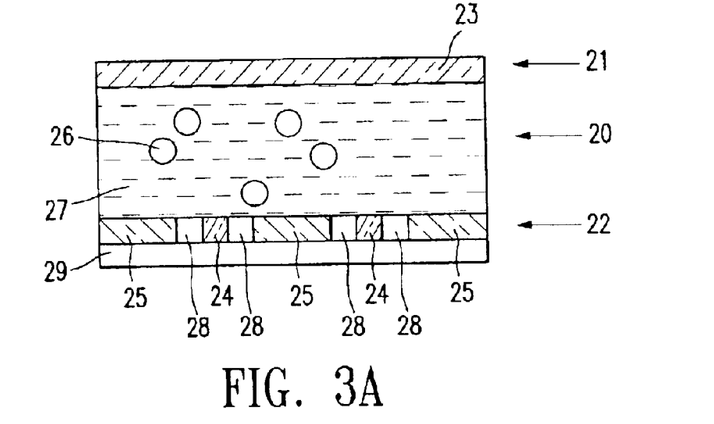
FIGS. 3A–3C illustrate various holding electrode structures.

An electrophoretic display having at least one holding electrode is disclosed. In one embodiment, as shown in FIG. 3A, the display comprises a top electrode layer (21) and a bottom electrode layer (22), at least one of which is transparent (e.g., top electrode layer 21), and a cell (20) positioned between the two layers. The top electrode layer (21) comprises a row electrode (23). The bottom electrode layer (22) comprises three column electrodes (25) and two holding electrodes (24), each holding electrode being positioned between two column electrodes. Gaps (28) space the holding electrodes (24) from the adjacent column electrodes (25). The top row electrodes and bottom column electrodes are perpendicular to each other. A background layer (29) is positioned under the bottom electrode layer (22). The EPD cell (20) comprises charged particles (26) in a colored dielectric solvent (27). In one embodiment, both the background layer (29) and the charged particles (26) are white in color. In one embodiment, the particles (26) are positively charged.

Figure 3B:
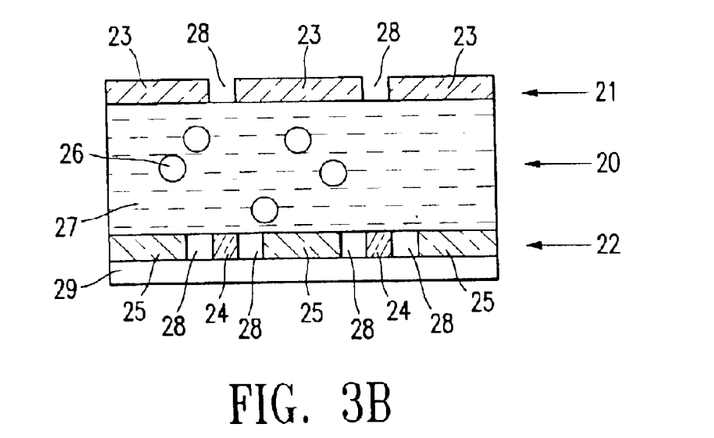

An alternative embodiment is shown in FIG. 3B, in which the top electrode layer comprises a plurality of row electrodes (23), each of the plurality of electrodes being associated with the same row of EPD cells. Additional gaps (28) space the row electrodes (23) from each other. In one embodiment, the gaps used to space the row electrodes from each other may be different than the gaps used to space the holding electrodes from the adjacent column electrodes.

Figure 3C:
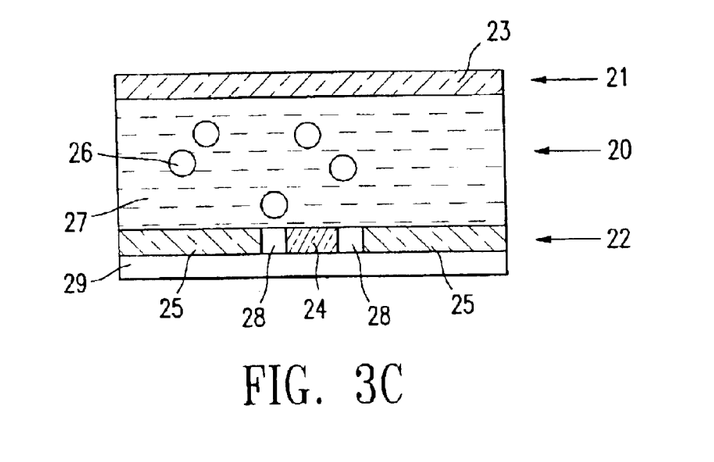

FIG. 3C shows an embodiment having a single holding electrode (24) placed in the bottom electrode layer between two column electrodes (25).

FIGS. 3A–3C illustrate just a few representative designs. It is understood that in order to meet the specific requirements of a particular EPD, the number of holding electrodes and their placement and dimensions may vary, and all such variations are within the scope of the present invention.

II. Passive Driving Matrix with Holding Electrodes

For a typical passive driving matrix, cells are scanned row by row and particles are driven to the desired location by applying prescribed voltages to the respective electrodes of the display. A "scanning" row in a passive matrix display is a row in the display that is currently being updated or refreshed. A "non-scanning" row is a row that is not currently being updated or refreshed. The voltages applied to the respective electrodes associated with a particular cell of the display are sometimes referred to herein as the "bias conditions" or "bias voltages" applied to the cell. A "positive bias", in the context of the present disclosure, is defined as a bias that tends to cause positively charged particles to migrate downwards (i.e., upper electrode at higher potential than lower electrode). A "negative bias", in the context of the present disclosure, is defined as a bias that tends to cause positively charged particles to migrate upwards (i.e., lower electrode at higher potential than upper electrode). For a cell in a scanning row, the driving voltage (i.e., bias conditions) should either drive the particles to a desired new location or maintain the particles at the same location. For a cell on a non-scanning row, the driving voltage should maintain the particles at the same location even if the bottom column driver voltage (i.e., the voltage applied to the column electrode associated with the cell) changes, such as may occur if a cell in the scanning row in that column is being switched (i.e., under a cross bias condition).

An electrode to which a driving voltage is applied to drive the charged particles either to the top of the cell, to a position at or near the top electrode layer, or to the bottom of the cell, to a position at or near the bottom electrode layer, such as the top and bottom electrodes described in the preceding paragraph and the row electrodes (23) and column electrodes (25) of FIGS. 3A–3C, are referred to herein as a "driving electrode".

The voltages described herein may be positive, negative or zero in magnitude. As used herein, a first voltage is "higher" than a second voltage if the first voltage is at a higher potential than the second voltage. Restated, as used herein a first voltage is higher than a second voltage if a positively charged particle would tend to move from an area at the first voltage to an area at the second voltage. Using this convention, a positive voltage of 40V is higher than a positive voltage of 20V. A voltage of 40V likewise is higher than a voltage of 0V and higher than a voltage of −20V. Likewise, a voltage of −20V is higher than a voltage of 40V, even though the absolute value of the latter voltage is greater. Similarly, as used herein a first voltage is "greater than" a second voltage if the first voltage is at a higher potential than the second voltage. Conversely, as used herein a first voltage is "lower" than or "less than" a second voltage if the first voltage is at a lower potential than the second voltage.

In one embodiment, an electrophoretic display is provided in which the display is updated one row at a time, with the goal being to update the cells of the scanning row while leaving the cells in the non-scanning rows unchanged. In one embodiment, all cells of the scanning row are first reset to a state in which the charged particles are at or near the top electrode. In one embodiment, this is accomplished by applying a negative bias to all cells in the row, such as by setting the top row electrode at 0 volts and setting both the bottorri column electrodes and the holding electrodes at 30 volts.

Once reset to a state in which the charged particles are at or near the top electrode, each individual cell in the scanning row is biased to either (1) switch the cell to a state in which the particles are at or near the holding electrode(s) or (2) retain the cells in the reset state (i.e., particles at or near the top electrode).

Figure 4A:
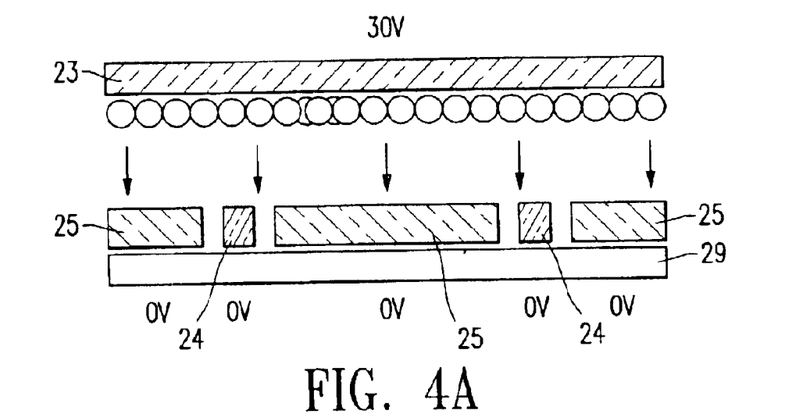
FIGS. 4A and 4B show the movement of particles during the 2-step driving sequence to switch a cell.
Figure 4B:
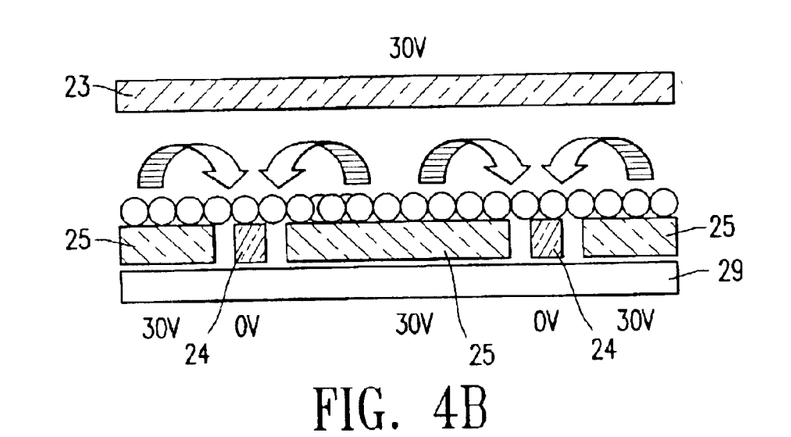

For example, in one embodiment using the structure illustrated in FIG. 3A and in which the particles are in white color and positively charged, the particles may be switched from a first state in which they are at or near the top electrode to a second state in which they are at or near the holding electrodes using a two-step driving cycle. FIG. 4A shows such a cell in a scanning row with the particles at or near the top electrode (23). The cell is positively biased at 30V, so the particles move down to the bottom electrodes (25) and the holding electrodes (24), which are set at 0V. FIG. 4B shows the second step. The top electrode (23) and the bottom electrodes (25) are set at 30V, and the holding electrodes (24) are set at 0V. Under these bias conditions, the particles migrate to a position at or near the holding electrodes (24). In this state, the bottom white background (29) is exposed, and the display is in the color state (solvent color).

Figure 5:
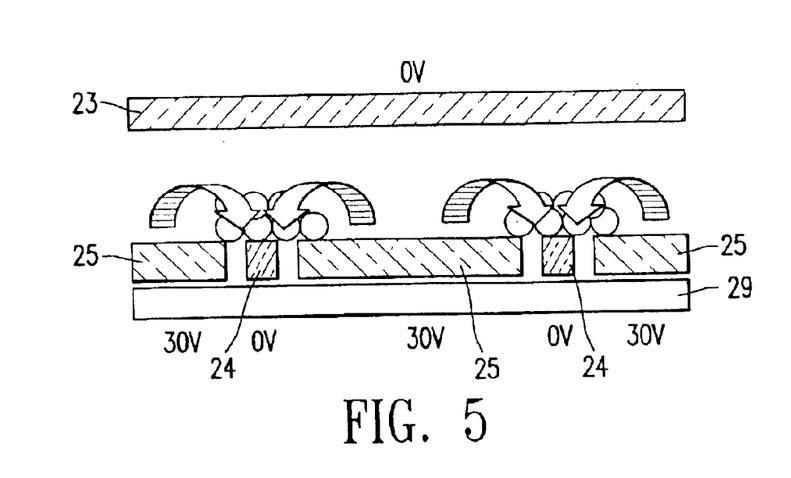
FIG. 5 shows the holding effect for particles on the bottom of the cell during non-scanning cycles.

FIG. 5 shows the non-scanning cycles after the 2-step driving sequence illustrated in FIGS. 4A and 4B has been completed during a scanning cycle, in which the charged particles were driven to a position at or near the holding electrodes (24), as described above. In order to retain this state during a non-scanning cycle, the top electrode (23) and the holding electrodes (24) are set at 0V. All particles are held at the holding electrodes (24), which is at 0V, even if the bottom electrodes (25) are set at 30V, such as may be necessary to change or retain the state of a cell of the scanning row that is on the same column as the cell shown in FIG. 5 (e.g., if the cell in the scanning row were being subjected to the bias conditions of FIG. 4B).

Figure 6:
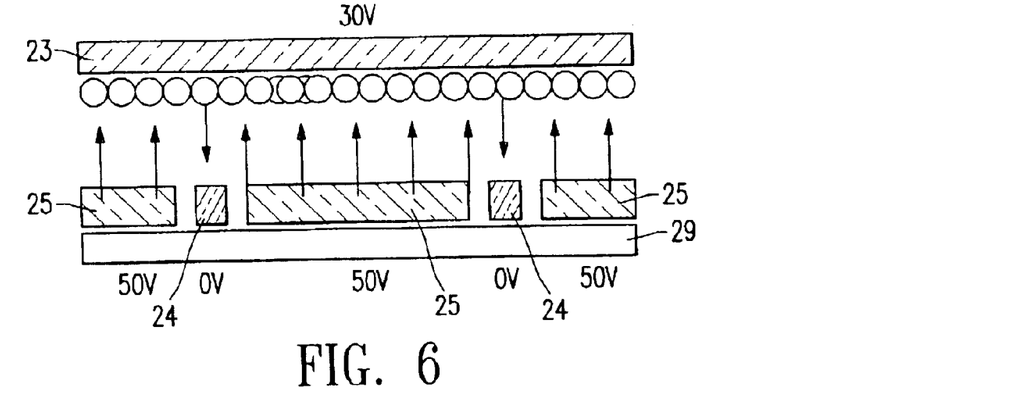
FIG. 6 shows the bias conditions for a non-switching cell on the scanning row.

FIG. 6 shows the bias conditions for a cell in the scanning row, which is to be retained in the reset state, i.e., particles at or near the top electrode (23). Like the cell shown in FIGS. 4A and 4B, the top row electrode (23) is set to 30V during the scanning cycle, as the same row electrode (23) overlies all cells in the scanning row. To prevent the positively charged particles from being driven to the bottom electrodes (25) and/or holding electrodes (24), the cell is negatively biased by applying 50V to the bottom column electrodes (25). In one embodiment, the holding electrodes (24) are always set at 0V, except during the reset operation described above. The voltages selected for the top row electrode (23) and bottom column electrodes (25), as well as the relative dimensions or the column electrodes (25) and holding electrodes (24), are selected so as to largely prevent charged particles at the top electrode (23) from being driven to the holding electrodes (24) under the conditions illustrated in FIG. 6, notwithstanding the fact that the holding electrodes (24) are set at a voltage lower than the top row electrode (23).

Figure 7A:
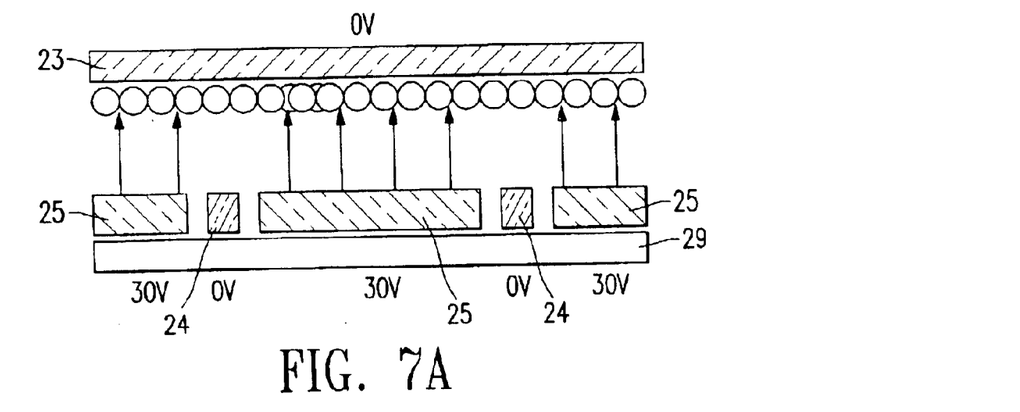
FIGS. 7A and 7B show the holding effect for particles on the top of the cell during non-scanning cycles.
Figure 7B:
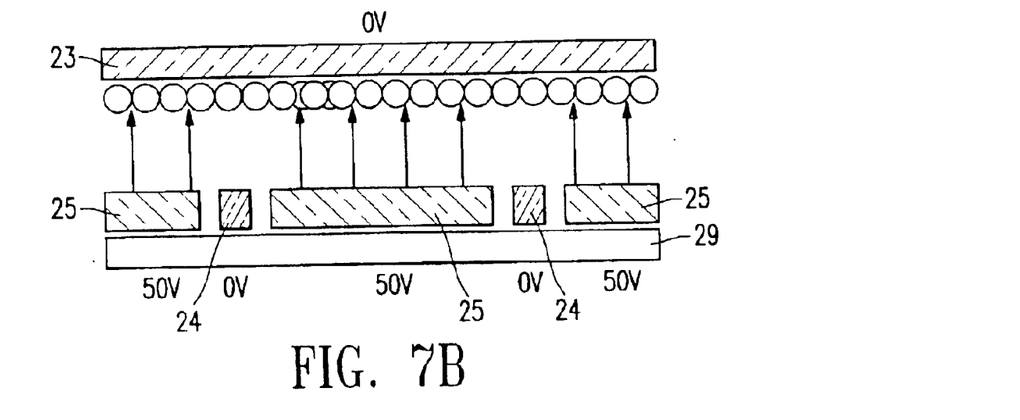

FIG. 7A shows the cell of FIG. 6 in non-scanning cycles, during which the goal would be to retain the particles at or near the top electrode (23). As in the non-scanning row cell shown in FIG. 5, the top row electrode (23) is set to 0V. The holding electrodes (24) also are set at 0V, as may be necessary to retain the state of other cells associated with the holding electrodes in other non-scanning rows. The bottom column electrodes (25) are set at 30V, such as may be necessary to complete the driving sequence for a cell on the same column but in the scanning row, as illustrated in FIG. 4B, for example. FIG. 7B shows another cell of FIG. 6 in non-scanning cycles, during which it is to be retained in the reset state (i.e., particles at or near the top electrode). In this case, the bottom column electrodes (25) are set at 50V, which occurs in one embodiment to retain the reset state for a cell on the same column but in the scanning row, as described above in connection with FIG. 6. With 0 volts applied to the top electrode (23), the particles would be held at the top electrode (23) under either the bias conditions shown in FIG. 7A or those shown in FIG. 7B.

As the discussion above demonstrates, the use of holding electrodes as described herein completely eliminates the need to provide an EPD cell with a high threshold voltage in order to prevent display performance degradation due to cross talk and/or cross bias. The holding electrodes actively hold the particles at the bottom of the cells, at or near the holding electrodes, for cells in the non-scanning row set to the "colored" (i.e., particles at the bottom and solvent color exposed) state, even when a cross bias or cross talk condition is present. The use of holding electrodes as described herein also makes it possible to always set the top row electrode at 0V for the non-scanning rows (as in FIGS. 5 and 7), because it is never necessary to set the row electrode at a higher voltage to counteract a cross bias effect, which ensures that the positively charged particles are retained at the top row electrode, exposing the white color of the particles, for cells in non-scanning rows set to the white state, regardless of the non-negative voltages applied to the column electrodes associated with the cells.

While the discussion above concerning the bias conditions applied under various circumstances to either change or retain the state of the EPD cells used as examples structures such as those illustrated in FIG. 3A (see FIGS. 4A–7), the same techniques may be applied to cells having electrode structures such as illustrated in FIGS. 3B and 3C. In all of the exemplary structures illustrated in FIGS. 3A–3C, the holding electrode(s) is/are located in the bottom electrode layer. In each embodiment, for a non-scanning row both the top row electrode and the holding electrode(s) are set at the lowest voltage of the driver voltages to hold particles at their starting location (either at the top row electrode or at the bottom holding electrode(s), as explained more fully below) during non-scanning cycles, as illustrated in FIGS. 5 and 7 and as described in the above discussion of FIGS. 5 and 7. Likewise, the techniques illustrated in FIGS. 4A–4B and in FIG. 6, and described in the above discussion regarding FIGS. 4A–4B and in FIG. 6, can be applied as well to structures such as those illustrated in FIGS. 3B and 3C. As stated above, the structures illustrated in FIGS. 3A–3C are merely exemplary, and other or different structures using holding electrodes may be used as well, depending on the design considerations of a particular display.

The electrode structure described herein is extremely simple. It only requires a single layer electrode on both the top layer and the bottom layer of the EPD, because the holding electrodes are formed in the same layer as the bottom column electrodes. Such electrode layers can be fabricated using low cost materials and processes. A further advantage is that low cost drivers may be used to drive the various electrodes to the required voltages, as it is not necessary to be able to apply a wide variety of voltages to the non-scanning rows to avoid the effects of cross talk and cross bias.

III. Grayscale EPD with Holding Electrodes

The discussion above focuses on changing or retaining the state of an EPD call between a first state in which the charged particles are at or near the top electrode and a second state in which all or most of the charged particles are at or near the holding electrodes located in the bottom electrode layer. In one embodiment, as described above, the charged particles are white and the white color of the particles is perceived when the cell is set to the first state. When the cell is set to the second state, the color of the solvent is perceived. By controlling the quantity of particles held at either the top electrode or the holding electrodes of a cell, various grayscale levels can be achieved between the color of the particles and the color of the solvent.

Figure 8A:
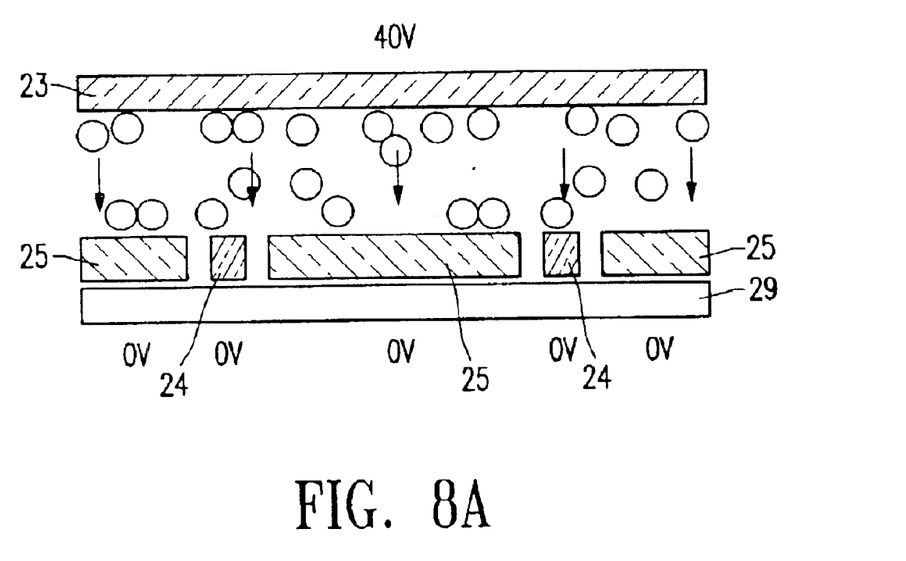
FIGS. 8A and 8B show a two-step driving sequence for a grayscale EPD with holding electrodes.

For example, a holding electrode structure as shown in FIGS. 3A–3C can be used to provide an EPD grayscale display. In one embodiment, each cell in the scanning row is reset to a state in which the charged particles are at or near the top row electrode, as described above. A two-step driving cycle is then used to achieve a grayscale display:

Step 1: FIG. 8A is a schematic diagram of a cell in a scanning row in which the particles initially were located at or near the top electrode (23) after reset. The top electrode (23) is set at 40V with a specific pulse width T1, while the bottom electrodes (25) and the holding electrodes (24) are set at 0V for the same duration. Under these biasing conditions, some but not all of the particles move downward in the direction of the bottom electrodes (25) and the holding electrodes (24). The pulse width T1 is selected such that a specific proportion of the particles move away from the top electrode (23). Some of the particles that move away from the top electrode (23) in this first step may reach either the bottom electrodes (25) or the holding electrodes (24), while others may be dispersed in the solvent at a point between the top and bottom of the cell.

Figure 8B:
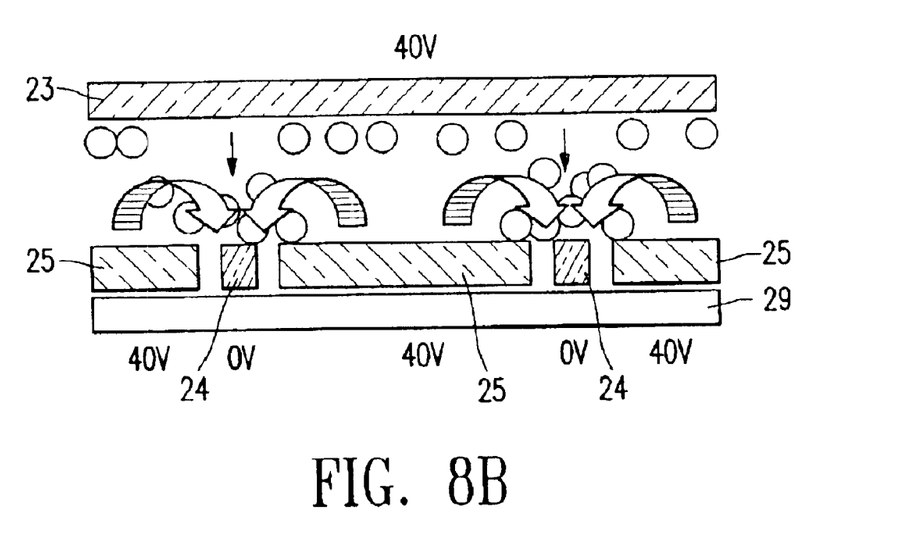

Step 2: As shown in FIG. 8B, during the second step of the grayscale driving operation the top electrode (23) is set at 40V with a specific pulse width T2, while the bottom electrodes (25) are set at 40V and the holding electrodes (24) are set at 0V for the same duration. Under these conditions, the particles at the bottom electrodes (25) will migrate to the holding electrodes (24). Most particles in the dispersion also will migrate to the holding electrodes (24) due to the low voltage applied to the holding electrodes (24). Most particles at the top electrode (23) will stay at the top electrode (23) with only a few particles migrating to the holding electrodes (24), because the field between the top electrode (23) and the holding electrodes (24) will not be sufficiently strong to pull the particles away from the top electrode (23) due to the high voltage applied to the bottom column electrodes (25) and the relative dimensions of the column electrodes (25) and the holding electrodes (24).

Figure 9:
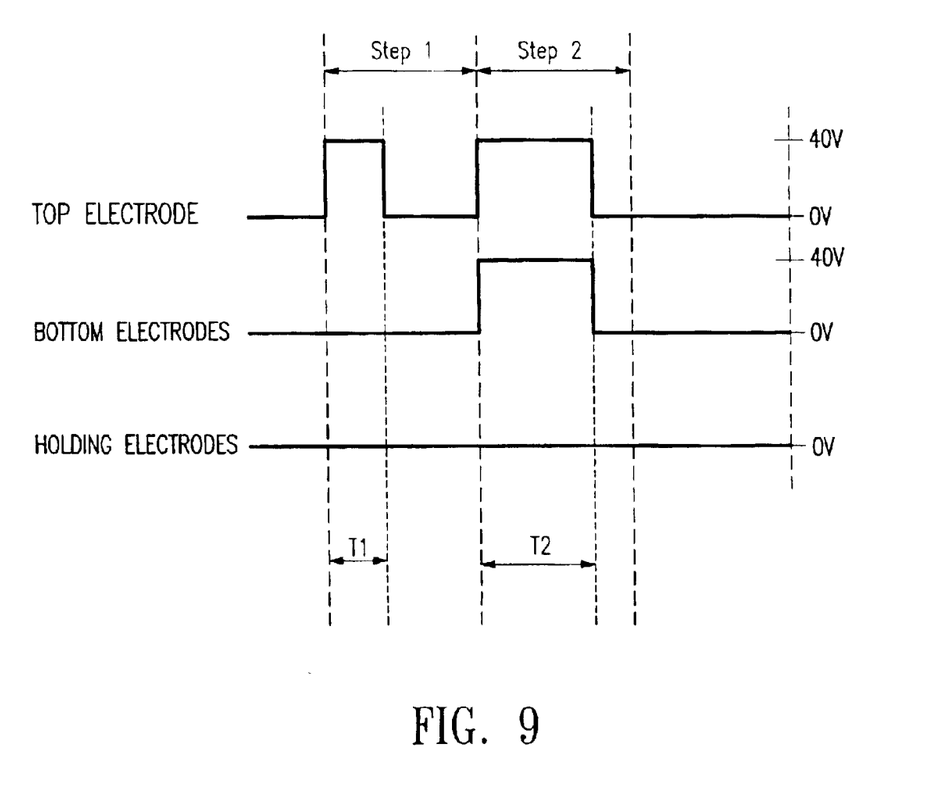
FIG. 9 shows the driving voltage waveforms of a two-step driving sequence for a grayscale EPD.

FIG. 9 shows the driving waveforms of the two-step grayscale driving sequence described above. As described above, by carefully selecting the pulse width of T1 and T2, specific amount of particles are migrated and held at the top electrode (23) and the holding electrodes (24), thereby achieving a specific level of grayscale. Other modulation algorithms, such as voltage amplitude modulation, pulse rate modulation and a combination of these modulations algorithms can also be applied to this electrode structure to achieve a similar result. These various modulation techniques when used with the holding electrode structure disclosed herein are also within the scope of the present invention.

Figure 10:
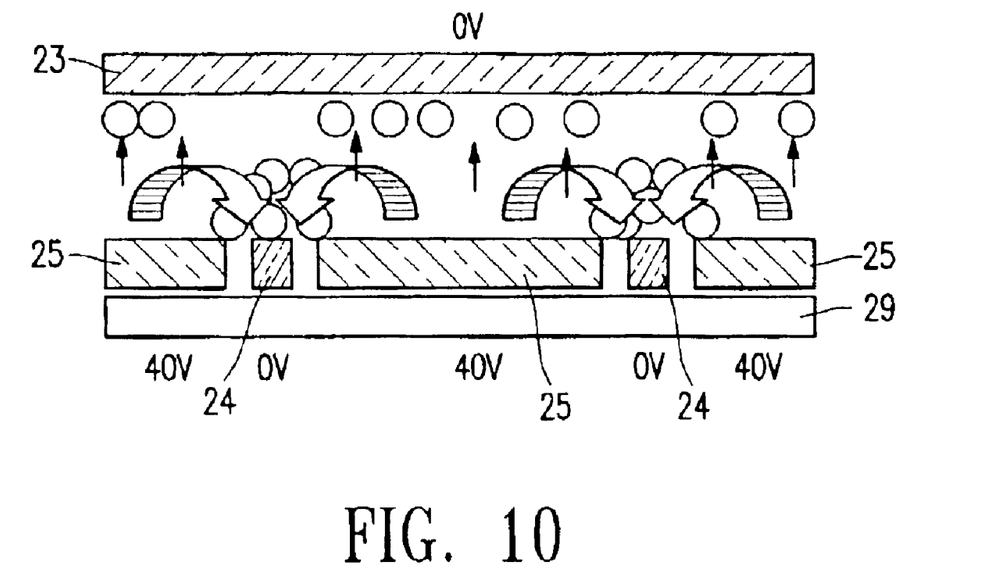
FIG. 10 shows the holding effect after the two-step grayscale driving sequence for cells in non-scanning rows.

FIG. 10 shows the non-scanning cycles after the 2-step grayscale driving sequence described above. In order to maintain the state of the cell at the grayscale state achieved by the two-step grayscale driving sequence, the top electrode (23) and the holding electrodes (24) are set at 0V during non-scanning cycles. Therefore, the particles driven to these two electrodes during the two-step grayscale driving sequence are held at any cross bias condition, such as the condition shown in FIG. 10, in which the bottom column electrodes (25) are set to 40V (e.g., to maintain or change the state of a cell on the same column but in the scanning row).

This invention achieves a high quality grayscale display with a simple passive matrix electrode structure. The holding electrode and driving voltage sequence eliminate the impact of cross talk and cross bias, and therefore eliminate the need to provide a cell with a high threshold voltage. The electrode structure of this invention is extremely simple. It only requires a single electrode layer for both the top layer and the bottom layer of the EPD. Such an electrode layer can be fabricated using low cost materials and processes.

While the present invention has been described with reference to the specific embodiments thereof, it should be understood by those skilled in the art that various changes may be made and equivalents may be substituted without departing from the true spirit and scope of the invention. In particular, while certain embodiments described in detail above comprise one or more row electrodes in the top electrode layer and one or more column electrodes in the bottom electrode layer, the present invention encompasses other displays using other arrangements of electrodes. For example, a display in which the top electrodes are column electrodes and the bottom electrodes are row electrodes also would be within the scope of the present invention. Other configurations of driving electrodes, other than the customary arrangement of rows and columns, may also be used. In addition, many modifications may be made to adapt a particular situation, materials, compositions, processes, process step or steps, to the objective, spirit and scope of the present invention. All such modifications are intended to be within the scope of the claims appended hereto.

It is therefore wished that this invention to be defined by the scope of the appended claims as broadly as the prior art will permit, and in view of the specification.

What is claimed is:

1. An electrophoretic display comprising:
    (a) a plurality of electrophoretic cells filled with charged particles dispersed in a dielectric solvent; each said cell being positioned between a top electrode layer and a bottom electrode layer, said top electrode layer comprising at least one driving electrode positioned over at least one cell and said bottom electrode layer comprising at least one driving electrode positioned under said at least one cell; and
    (b) a holding electrode located in the bottom electrode layer and positioned under said at least one cell;
    wherein the holding electrode is configured and biased such that when said at least one cell has been switched to a state in which the charged particles of said at least one cell are in a position at or near said holding electrode a holding electric field is generated to hold the charged particles in said position at or near said holding electrode during scanning of a row that does not comprise said at least one cell notwithstanding that the respective bias voltages applied to said driving electrodes would otherwise establish in said cell a driving electric field that would tend to drive the charged particles in the direction of said top electrode layer if said holding electrode were not present.

2. The electrophoretic display of claim 1 where in said bottom layer comprises at least two driving electrodes and wherein said holding electrode is located between two of said at last two driving electrodes in the bottom electrode layer.

3. The electrophoretic display of claim 1 wherein said at least one holding electrode is located adjacent to said at least one driving electrode in the bottom electrode layer.

4. The electrophoretic display of claim 3 further comprising a gap between the holding electrode and the at least one driving electrode in the bottom electrode layer to which it is located adjacent.

5. The electrophoretic display of claim 1 wherein said at least one driving electrode of the bottom electrode layer is a row electrode.

6. The electrophoretic display of claim 1 wherein said at least one driving electrode of the bottom electrode layer is a column electrode.

7. The electrophoretic display of claim 1 wherein:
    said charged particles are positively charged; and
    during non-scanning cycles the holding electrode is set at a voltage less than or equal to the lowest voltage applied to any other electrode associated with said cell associated with the holding electrode, whereby the charged particles in said cell associated with the holding electrode are prevented from moving from a position at or near the holding electrode.

8. The electrophoretic display of claim 1 wherein:
    said charged particles are negatively charged; and
    during non-scanning cycles the holding electrode is set at a voltage equal to or greater than the highest voltage applied to any driving electrode associated with said cell associated with the holding electrode, whereby the charged particles in said cell associated with the holding electrode are prevented from moving from a positi at or near the holding electrode.

9. The electrophoretic display of claim 1 wherein:
said particles are positively charged; and
each respective one of the at least one driving electrodes of the top electrode layer is set, during non-scanning cycles for the respective cells over which the driving electrode of the top electrode layer is positioned, at a voltage less than or equal to the lowest voltage applied to any electrode associated with any of the respective cells over which the driving electrode of the top electrode layer is positioned;
whereby the charged particles in any of the respective cells in which the particles are in a position at or near the driving electrode of the top electrode layer are prevented from moving from said position at or near the driving electrode of the top electrode layer.

10. The electrophoretic display of claim 1 wherein the particles are positively charged and wherein to move the charged particles of a cell from a first position at or near the top electrode layer to a second position at or near said bottom electrode layer, those driving electrodes of the bottom electrode layer that are associated with the cell are set at a first voltage, those driving electrodes of the top electrode layer that are associated with the cell are set at a second voltage that is higher than the first voltage, and the holding electrodes that are associated with the cell are set to a voltage that is less than or equal to the first voltage.

11. The electrophoretic display of claim 1 wherein the particles are positively charged and wherein to move the charged particles of a cell from a first position at or near the driving electrodes of bottom electrode layer that are associated with the cell to a second position at or near the holding electrodes associated with the cell, the driving electrodes of the bottom electrode layer that are associated with the cell are set at a first voltage, the driving electrodes of the top electrode layer that are associated with the cell are set at a second voltage that is equal to or greater than the first voltage, and the holding electrodes associated with the cell are set to a voltage that is less than the first voltage.

12. The electrophoretic display of claim 1 wherein the particles are positively charged and wherein the display is configured such that the charged particles of a cell are moved from a first position at or near the top electrode layer to a second position at or near one or more holding electrodes associated with the cell by a two step driving process comprising:
in a first step, setting those driving electrodes of the bottom electrode layer that are associated with the cell at a first voltage, setting those driving electrodes of the top electrode layer that are associated with the cell at a second voltage that is higher than the first voltage, and setting the one or more holding electrodes associated with the cell to a voltage that is less than or equal to the first voltage; and
in a second step following the first step, setting those driving electrodes of the bottom electrode layer that are associated with the cell at a third voltage, setting those driving electrodes of the top electrode layer that are associated with the cell at a fourth voltage that is equal to or greater than the third voltage, and setting the one or more holding electrodes associated with the cell to a voltage that is less than the third voltage.

13. The electrophoretic display of claim 1 wherein the particles are positively charged and wherein, to maintain the particles of a cell, the cell being one of a group of cells associated with at least one common electrode of the top electrode layer, in a position at or near the top electrode layer during a scanning cycle for the group of cells, those driving electrodes of the top electrode layer that are associated with the cell are set at a first voltage, those driving electrodes of the bottom electrode layer that are associated with the cell are set at a second voltage that is greater than the first voltage, and those holding electrodes associated with the cell are set at a voltage that is less than or equal to the first voltage.

14. The electrophoretic display of claim 13 wherein the group of cells comprises a row of cells and the at least one common electrode of the top electrode layer is a row electrode.

15. The electrophoretic display of claim 1 wherein those driving electrodes of the top row electrode layer that are associated only with cells that are not being scanned and the holding electrodes associated with said cells that are not being scanned are set at a voltage that is less than or equal to the lowest voltage then being applied to any driving electrode associated with said cells to prevent the particles from moving away from a previouslyset position either (1) at or near the top electrode layer or (2) at or near the respective holding electrodes associated with each respective one of said cells that are not being scanned.

16. An electrophoretic display comprising:
(a) a plurality of electrophoretic cells filled with charged particles dispersed in a dielectric solvent; each said cell being positioned between a top electrode layer and a bottom electrode layer, said top electrode layer comprising at least one driving electrode positioned over at least one cell and said bottom electrode layer comprising at least one driving electrode positioned under said at least one cell;
(b) a holding electrode located in the bottom electrode layer and positioned under said at least one cell; and
(c) a colored background layer located under and visible through the bottom electrode layer;
wherein the holding electrode is configured and biased such that when said at least one cell has been switched to a state in which the charged particles of said at least one cell are in a position at or near said holding electrode a holding electric field is generated to hold the charged particles in said position at or near said holding electrode during scanning of a row that does not comprise said at least one cell notwithstanding that the respective bias voltages applied to said driving electrodes would otherwise establish in said cell a driving electric field that would tend to drive the charged particles in the direction of said top electrode layer if said holding electrode were not present.

17. The electrophoretic display of claim 16 wherein:
the charged particles are positively charged and of the same color as the colored background;
the dielectric solvent is colored and has a different color than the colored background; and
to achieve in one of the cells a desired grayscale level between the color of the background and the color of the dielectric solvent, from a starting condition in which the particles have been reset to a position at or near the top electrode layer, those driving electrodes of the bottom electrode layer that are associated with the cell are set for a period T1 at a first voltage, those driving electrodes of the top electrode layer that are associated with the cell are set for said period T1 at a second voltage that is greater than the first voltage, and those holding electrodes associated with the cell are set to a voltage that is less than or equal to the first voltage;
whereby a desired proportion, but not all, of the particles are moved away from the top electrode layer.

18. The electrophoretic display of claim 17 wherein the length of the period T1 is selected to achieve the desired level of grayscale.

19. The electrophoretic display of claim 17 wherein once the desired proportion of the particles have been moved away from the top electrode layer those driving electrodes of the top electrode layer that are associated with the cell are set for said period T2 at a third voltage, those driving electrodes of the bottom electrode layer that are associated with the cell are set for said period T2 at a fourth voltage that is less than or equal to said third voltage, and those holding electrodes associated with the cell are set to a voltage that is less than said fourth voltage, whereby most of the particles that were moved away from the top electrode layer migrate to a position at or near the holding electrodes associated with the cell and most of the particles that were not moved away from the top electrode layer maintain their position at or near the top electrode layer thereby achieving the desired grayscale level.

20. The electrophoretic display of claim 19 wherein the third voltage is the same as the second voltage.

21. The electrophoretic display of claim 19 wherein the fourth voltage is the same as the third voltage.

22. The electrophoretic display of claim 19 wherein to maintain a constant grayscale level in the cell during non-scan cycles those driving electrodes of the top electrode layer that are associated with the cell and those holding electrodes associated with the cell are set at a voltage that is less than or equal to the lowest voltage then being applied to any other electrode associated with the cell, whereby most of the particles that migrated to the holding electrodes maintain their position at or near the holding electrodes and most of the particles that were not moved away from the top electrode layer maintain their position at or near the top electrode layer.

23. The electrophoretic display of claim 19 wherein the length of the period T1 and the length of the period T2 are selected to achieve the desired level of grayscale.

24. The electrophoretic display of claim 16 wherein:
the charged particles are positively charged and of the same color as the colored background;
the dielectric solvent is colored and has a different color than the colored background; and
to achieve in one of the cells a desired grayscale level between the color of the background and the color of the dielectric solvent from a starting condition in which the particles have been reset to a position at or near the top electrode layer, those driving electrodes of the bottom electrode layer that are associated with the cell are set at a first voltage for a number N1 of pulses of equal pulse width during a first period, those driving electrodes of the top electrode layer that are associated with the cell are set at a second voltage that is greater than the first voltage for said number N1 of pulses of equal pulse width during the first period, and those holding electrodes associated with the cell are set to a voltage that is less than or equal to the first voltage;

whereby a desired proportion, but not all, of the particles are moved away from the top electrode layer.

25. The electrophoretic display of claim 24 wherein the number N1 is selected to achieve the desired level of grayscale.

26. The electrophoretic display of claim 24 wherein once the desired proportion of the particles have been moved away from the top electrode layer those driving electrodes of the top electrode layer that are associated with the cell are set for a number N2 of pulses of equal pulse width at a third voltage during a second period, those driving electrodes of the bottom electrode layer that are associated with the cell are set during said second period for said number N2 of pulses of equal pulse width at a fourth voltage that is less than or equal to said third voltage, and those holding electrodes associated with the cell are set to a voltage that is less than said fourth voltage, whereby most of the particles that were moved away from the top electrode layer migrate to a position at or near the holding electrodes associated with the cell and most of the particles that were not moved away from the top electrode layer maintain their position at or near the top electrode layer thereby achieving the desired grayscale level.

27. The electrophoretic display of claim 26 wherein the number N1 and the number N2 are selected to achieve the desired level of grayscale.

28. The electrophoretic display of claim 1 wherein said electrophoretic cells are prepared from microcups.

29. The electrophoretic display of claim 1 wherein said electrophoretic cells are prepared from microchannels.

30. The electrophoretic display of claim 1 wherein said electrophoretic cells are prepared from microcapsules.

* * * * *